(No Model.)

C. J. WEINMAN & E. E. EUCHENHOFER.
GOVERNOR.

No. 535,475. Patented Mar. 12, 1895.

Witnesses

Inventors
Christian J. Weinman
Edward E. Euchenhofer
By their Attorney

UNITED STATES PATENT OFFICE.

CHRISTIAN J. WEINMAN AND EDWARD E. EUCHENHOFER, OF DAYTON, OHIO.

GOVERNOR.

SPECIFICATION forming part of Letters Patent No. 535,475, dated March 12, 1895.

Application filed June 15, 1894. Serial No. 514,650. (No model.)

*To all whom it may concern:*

Be it known that we, CHRISTIAN J. WEINMAN and EDWARD E. EUCHENHOFER, citizens of the United States, residing at Dayton, in the county of Montgomery and State of Ohio, have invented certain new and useful Improvements in Governors, of which the following is a specification, reference being had therein to the accompanying drawings.

This invention relates to certain new and useful improvements in governors or governor mechanism used for the purpose of regulating the speed of engines, being particularly designed for and applicable to gas engines, though not confined to them. We have manufactured this improved governor for use in connection with gas engines and have shown and described it, but have not claimed it, in an application for improvements in gas engines filed by us January 11, 1894, Serial No. 496,456.

The several peculiarities of this invention will hereinafter appear and be particularly pointed out in the claims.

Figure 1:
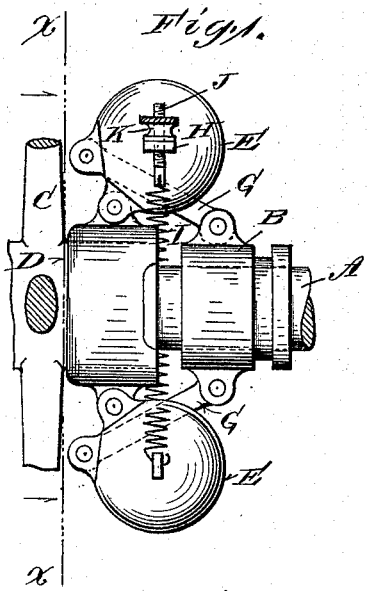
Figure 2:
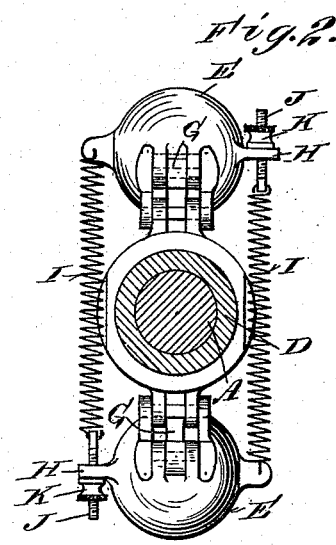
Figure 3:
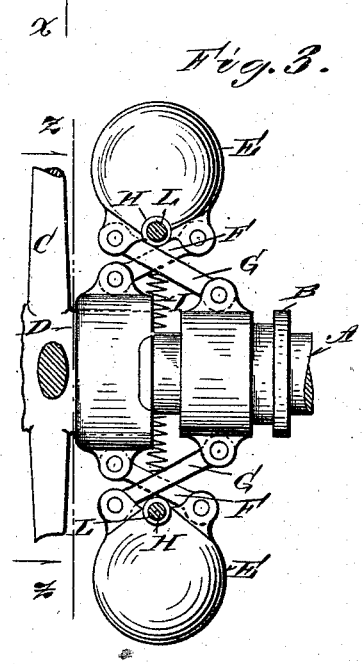

In the accompanying drawings on which like reference letters indicate corresponding parts: Figure 1, is a side elevation of our improved governor showing a portion of the main shaft and fly wheel of an engine; Fig. 2, a sectional view of what is shown in Fig. 1, the section being taken on the line $xx$. Fig. 3, is a similar view to Fig. 1, showing a modification in respect to the manner of mounting the governor balls, and Fig. 4, is a sectional view on the line $zz$ of what is shown in Fig. 3.

The letter A designates the main shaft of an engine, either steam or gas, or employing any other motive agent, on which shaft is mounted a reciprocating collar B grooved so as to be readily engaged with the valve mechanism which it is to control.

Figure 4:
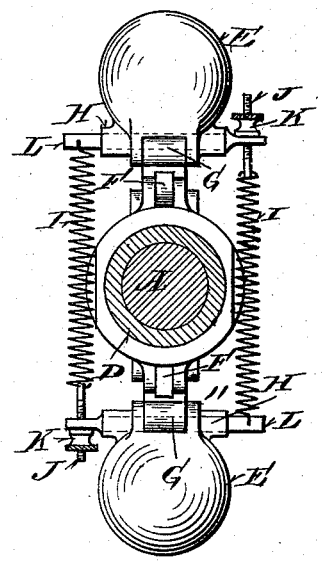

A fly wheel C is secured to the shaft A and to its hub D are pivoted the governor balls or weights E, directly as shown in Figs. 1 and 2, and indirectly or through a link F, as shown in Figs. 3 and 4. To these balls or weights are pivoted links G, which in turn are pivoted to the collar B. In the form shown in Figs. 1 and 2 the balls or weights are slotted to accommodate the position of the links G. In this form the balls or weights are provided with lugs H to which the springs I are connected. One lug of each ball or weight carries a screw-bolt J which, by a nut K, is adjusted to regulate the tension of the springs. The same arrangement is shown in the form illustrated in Figs. 3 and 4, with the exception that the lugs H are farther inward on the balls or weights and a pin L is passed through the lugs, to which the springs are connected and by which the screw bolts and nuts are supported. The preferred form is shown in Figs. 1 and 2 because it is more simple.

In practice we have found this governor mechanism to be very sensitive and reliable in operation. The movements of the weights or balls are regular and smooth, being free from jerks or tendency to fail to respond to the centrifugal force and then to suddenly respond too rapidly. Their control over the reciprocating collar is also very efficient.

Having thus fully described our invention, what we claim as new, and desire to secure by Letters Patent, is—

1. In a governor, the combination with a main shaft, of balls or weights pivotally carried by the said shaft through suitable intermediate devices, links pivoted to the balls or weights and crossing the ball or weight pivots, a device on the shaft to actuate the engine valve, to which device the links are pivoted, and springs interconnecting the balls or weights to hold them against centrifugal force.

2. In a governor, the combination with a shaft, and a fixture thereon, weights pivoted directly to said fixture, links pivoted to the weights at one side of their pivots, a sliding collar on the shaft pivotally connected to said links, the weights being slotted to accommodate the links, lugs projecting from the weights, springs connected to the lugs and a device to adjust the tension of the springs, said device forming a part of the connection between the springs and the lugs.

In testimony whereof we affix our signatures in presence of two witnesses.

CHRISTIAN J. WEINMAN.
EDWARD E. EUCHENHOFER.

Witnesses:
E. J. FINKE,
W. H. H. ECKI.